No. 784,710. PATENTED MAR. 14, 1905.
G. G. TANDY.
HOOK AND EYE.
APPLICATION FILED JUNE 19, 1902. RENEWED JUNE 28, 1904.

WITNESSES:
Bessie Gorfinkel
K. Lockwood Nevins

INVENTOR.
Geo. G. Tandy
BY Francis M. Wright
ATTORNEY.

No. 784,710. Patented March 14, 1905.

UNITED STATES PATENT OFFICE.

GEORGE G. TANDY, OF SAN FRANCISCO, CALIFORNIA.

HOOK AND EYE.

SPECIFICATION forming part of Letters Patent No. 784,710, dated March 14, 1905.

Application filed June 19, 1902. Renewed June 28, 1904. Serial No. 214,497.

*To all whom it may concern:*

Be it known that I, GEORGE G. TANDY, a subject of the King of Great Britain, residing at San Francisco, in the county of San Francisco and State of California, have invented certain new and useful Improvements in Hooks and Eyes, of which the following is a specification.

Figure 1:
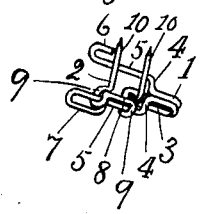
Figure 2:
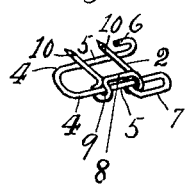
Figure 3:
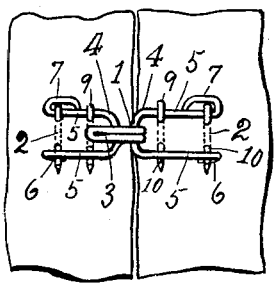
Figure 6:
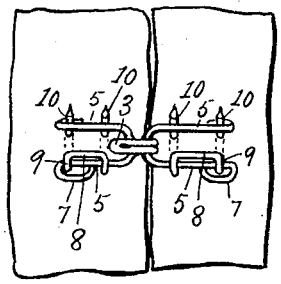
Figure 4:
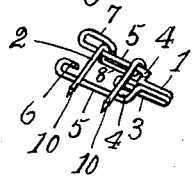
Figure 5:
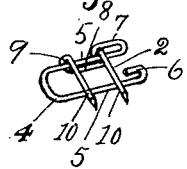

My invention relates to hooks and eyes, the object of my invention being to provide a hook and eye which can be readily attached to a garment in a firm manner without injuring the cloth and so as to admit of conveniently hooking together.
My invention therefore resides in the novel construction, combination, and arrangement of parts for the above ends, hereinafter fully specified, and particularly pointed out in the claims.
Referring to the drawings, Figure 1 is a perspective view of a hook of my improved construction. Fig. 2 is a similar view of an eye. Fig. 3 is a plan view of the hook and eye attached to the cloth. Figs. 4, 5, and 6 are similar views of a modified form of my device.

Referring to the drawings, it will be seen that the hook comprises two portions—a hook or engaging portion 1 and a pin portion 2, by means of which the hook is secured to the cloth. The hook portion 1 is formed of a piece of wire bent at the middle to form a hook 3, as shown, the sides then diverging, as shown at 4, and then extending in parallel shanks 5. The ends of said shanks are then turned back upon themselves, one end away from the hook, as shown at 6, and the other end in the plane of the two shanks and away from the other shank and then bent back toward the shank to form a loop 7. The pin portion is formed of a piece of wire which comprises a central portion 8, which lies along one of the shanks of the hook, being then bent into two eyes 9, which surround said shank and then extend in two parallel prongs across the hook, as shown at 10, the ends of said prongs being pointed for the purpose of penetrating the cloth. The eye of the prong which is farthest from the hook passes around the wire within the loop 7 and is limited in its movement by said loop. The pin portion thus has a sliding movement to and from the hook proper limited by the size of the loop 7. The end of this prong after being passed through the cloth is received within the bent portion 6 of the shank of the hook.

The eye is formed in precisely the same manner, the only difference being in the shape of the part which forms the eye as distinguished from that of the hook portion of the hook.

In operation the two prongs of the pin are passed into the cloth and out again, the hook being pushed back as far as permitted by the size of the loop 7 and the end of the bent portion 6 being then passed over the wire prong and pushed down upon the cloth. The hook is drawn forward so that said bent portion 6 passes underneath the prong, and the hook is firmly secured in place. The eye is attached in a similar manner.

In Figs. 4, 5, and 6 is shown a modification of the invention in which the wire of the pin is bent around the side of the hook or eye in a different direction from that of the form shown in Figs. 1, 2, and 3.

In the ordinary hook and eye attached by stitches to the cloth it is customary to attach the hook at two places to the cloth, one through the small eyes or loops at the end of the hook and then again at a point near the hook proper. This is necessary in order to hold the hook snugly against the cloth to permit of conveniently hooking the garment. Similarly with the eye. My invention attains the same object—namely, the securing of the hook or eye to the cloth at two points of its length. This is obtained by making the pin with two prongs, one of which is near the point of the hook or the hook proper and the other at the other end. Also in order to make a satisfactory hook and eye which can be attached to the cloth without stitching it is necessary to provide a construction by which the pull upon the cloth will be distributed throughout a considerable extent thereof transversely of the hook or eye. This I accomplish by arranging the pins transversely of the cloth, so that the pull upon the hook or eye is resisted by the whole extent of the cloth which covers the pins or prongs. Therefore by arranging the pins transversely of the hook or eye and by providing two pins or prongs for the hook and likewise for the eye, one pin being near the rear end of the hook and the other near the front end or hook proper, I provide a construction both durable and convenient.

I claim—

1. A hook-and-eye member comprising an engaging portion having two shanks, and a pin having two prongs both pivoted on one of said shanks and extending transversely of said shank across to the other shank and being engaged thereby, substantially as described.

2. A hook-and-eye member for attachment to the cloth without stitching comprising an engaging portion proper having two shanks spaced from each other, and a pin portion comprising two prongs spaced from each other, and pivoted on one of said shanks and extending transversely thereof to the other shank, said shank having means for engaging one of said prongs, substantially as described.

3. A hook-and-eye member for attachment to cloth without stitching comprising an engaging portion having two shanks spaced from each other, and a pin portion comprising two prongs spaced from each other and pivoted on one of said shanks and movable longitudinally thereon, said prongs extending transversely of said shanks across to the other shank, said latter shank having means for engaging one of said prongs, substantially as described.

4. A hook-and-eye member for attachment to cloth without stitching comprising an engaging portion having two shanks spaced from each other, and a pin portion comprising two prongs spaced from each other and pivoted on one of said shanks and movable longitudinally thereon, said shank having a loop limiting the longitudinal movement of said prongs, said prongs extending transversely of said shanks across to the other shank, said latter shank having means for engaging one of said prongs, substantially as described.

In witness whereof I have hereunto set my hand in the presence of two subscribing witnesses.

GEORGE G. TANDY.

Witnesses:
FRANCIS M. WRIGHT,
BESSIE GORFINKEL.